(12) United States Patent
Fischi et al.

(10) Patent No.: US 8,717,230 B1
(45) Date of Patent: May 6, 2014

(54) DIGITAL CLUTTER SPATIAL NULLING

(75) Inventors: Jonathan Fischi, Fayetteville, NY (US); Peter H. Stockmann, Jamesville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 253 days.

(21) Appl. No.: 13/397,269

(22) Filed: Feb. 15, 2012

(51) Int. Cl.
*G01S 13/52* (2006.01)
*G01S 13/524* (2006.01)

(52) U.S. Cl.
CPC ......... *G01S 13/5244* (2013.01); *G01S 13/5246* (2013.01)
USPC ............ 342/159; 342/162; 342/194; 342/195

(58) Field of Classification Search
CPC . G01S 13/5244; G01S 13/5246; G01S 7/288; G01S 7/2923; G01S 13/52; G01S 13/5242; G01S 13/5248; G01S 7/2813; G01S 7/292; G01S 7/2927
USPC .................................. 342/159–162, 194, 195
See application file for complete search history.

(56) References Cited

U.S. PATENT DOCUMENTS

| | | | | |
|---|---|---|---|---|
| 5,245,347 A * | 9/1993 | Bonta et al. | ............ | 342/149 |
| 5,376,939 A * | 12/1994 | Urkowitz | ............ | 342/134 |
| 5,416,488 A * | 5/1995 | Grover et al. | ............ | 342/159 |
| 5,465,095 A * | 11/1995 | Bryant | ............ | 342/159 |
| 5,841,395 A * | 11/1998 | Simone | ............ | 342/196 |
| 6,650,271 B1 * | 11/2003 | Simone et al. | ............ | 342/16 |
| 6,765,526 B1 * | 7/2004 | Doerry | ............ | 342/160 |
| 7,466,261 B1 * | 12/2008 | Hoctor et al. | ............ | 342/137 |
| 7,474,258 B1 * | 1/2009 | Arikan et al. | ............ | 342/159 |
| 2004/0085241 A1 * | 5/2004 | Arikan et al. | ............ | 342/195 |
| 2008/0316086 A1 * | 12/2008 | Hoctor et al. | ............ | 342/137 |
| 2010/0073218 A1 * | 3/2010 | Stockmann | ............ | 342/146 |
| 2010/0085245 A1 * | 4/2010 | Fischi | ............ | 342/195 |
| 2011/0181455 A1 | 7/2011 | Vanuytven | | |

OTHER PUBLICATIONS

Urkowitz, Harry; Owen, H.S., "A matrix clutter processor for agile beam radars," Radar Conference, 1998. RADARCON 98. Proceedings of the 1998 IEEE , vol., No., pp. 153,158, May 11-14, 1998.*
Steiner, M.; Gerlach, K., "The effect of the clutter-to-noise ratio on Doppler filter performance," Aerospace and Electronic Systems, IEEE Transactions on , vol. 31, No. 3, pp. 1177,1186, Jul. 1995.*

* cited by examiner

*Primary Examiner* — John B Sotomayor
(74) *Attorney, Agent, or Firm* — Howard IP Law Group PC

(57) ABSTRACT

A method and system for suppressing unwanted signals when detecting objects of interest in a detection system comprising an antenna system and two or more receive beams. A background map is created by range, azimuth and Doppler. Locations within the residual clutter in the moving Doppler bins are selected for nulling. Adaptive nulling is performed independently on each Doppler bin of the selected location to enable Doppler-specific spatial nulling for the same range and azimuth bin.

9 Claims, 7 Drawing Sheets

DIGITAL CLUTTER SPATIAL NULLING

FIELD OF THE INVENTION

The present invention relates to signal processing systems used in RADAR systems, and more particularly, to systems and methods for reducing and/or cancelling clutter in these systems.

BACKGROUND

Remote sensing systems, such as RADAR systems used to detect the presence, position, speed and/or other characteristics of objects, are vital to both civilian and military operations. These systems utilize electromagnetic (EM) waves to detect and classify, for example, precipitation and natural/man-made objects. In operation, these systems typically transmit "beams" or signals toward targets, and process reflected return signals (or echoes) for target identification and characterization. The presence of clutter in these return signals creates a significant technical challenge in the accurate processing of these signals.

In general, clutter, or components of return signals which are not of interest, can be attributed to both stationary and moving characteristics of a given background scene. Relatively stationary clutter sources include, for example, the ground, sea and various atmospheric conditions. Moving or Doppler-varying clutter sources may include precipitation as well as generally stationary objects comprising moving components. One example of a particularly problematic and growing source of Doppler-varying clutter is that generated by the wide-spread installation of wind turbine power generation farms. The level of clutter created by these natural and man-made sources may be orders of magnitude stronger than return signals generated by desired targets (e.g. aircraft). This clutter decreases RADAR performance by hindering the system's ability to detect targets and/or increase the probability of a false target detection.

Several solutions have been implemented into RADAR signal processing systems in an effort to reduce clutter levels and improve system performance. For example, clutter mapping algorithms have been developed which create a background map and perform constant false alarm rate (CFAR) thresholding. More particularly, return signals may be received by an antenna, amplified, down-converted and passed through detector circuitry. These signals comprise desired return (e.g. target) data as well as components comprising unwanted power from clutter sources. CFAR processing attempts to determine a threshold power above which any return can be considered to originate from a target. This threshold is set typically to achieve a desired probability of a false alarm, or false alarm rate. As unwanted clutter and interference sources may have noise levels which change both spatially and temporally, a varying threshold may be used to maintain a generally constant probability of false alarm. However, in areas of high-clutter, and thus high power returns, targets, such as aircraft passing over or through the clutter, may not pass this threshold test consistently. Further still, Doppler nulling has been used to address the clutter problem. However, Doppler nulling tends to create Doppler blind regions, with residual "uncancelled" clutter addressed via clutter mapping.

Referring generally to FIG. 1, many RADAR systems, such as air traffic control (ATC) systems, operate by forming two or more beams depicted notionally as beams 12,14 oriented at differing elevation angles with respect to a reflector antenna 10. In the illustrated system, a lower beam 14 is provided for tracking objects with lower elevation and a higher beam 12 is provided for tracking objects with higher elevation. Often lower beam 14 is subject to more clutter than higher beam 12, as ground-level clutter is typically encountered more frequently. Beam selection techniques may be implemented into these systems to mitigate clutter signal data. In the case of high, or higher, average clutter received (or expected to be received) by lower beam 14, selection (e.g. processing) of only beam 12 will reduce the average clutter received. However, this reduction is achieved at the expense of system coverage.

Analog spatial nulling techniques have also been implemented into antenna systems to reduce interference and clutter. These techniques may include reducing the sensitivity of a receiver/antenna in the direction of an identified interfering signal using analog weights. For example, FIG. 2 shows an analog weighting system and method implemented at the RF level for reducing or cancelling unwanted signals, wherein spatial nulling is performed prior to signal demodulation and Doppler filtering. System 100 may be responsive to one or more input sources, for example, first and second beams 12,14 of FIG. 1. These signals are received by first and second channels of a front end module, including, for example, low-noise amplifiers 101. Spatial nulling may be performed on each signal channel by a set of weights embodied as vector modulators 102 generated from a processor 104. The resulting modulated signals may be combined by combiner 106 and output to a receiver 108. Subsequent processing (e.g. Doppler filtering) may be performed by a second processor 110. It should be noted that because signal weighting is performed at the analog RF level before further signal processing, the same analog weights are applied across all Doppler-frequencies for a given range/azimuth position. As currently implemented, these analog systems and methods have significant limitations.

Improved systems and methods for clutter reduction are desired.

SUMMARY

In one embodiment of the present invention, a method for suppressing clutter when detecting objects of interest in a detection system is provided. The method includes receiving complex I/Q data from at least two input data streams, with each input data stream representing a RADAR signal containing clutter. The received signal is digitized, and a set of complex weights is applied to one of the at least two data streams for generating a weighted data stream for spatial nulling in the direction of received clutter. The weighted data stream is combined with the other data stream to form a combined, weighted data stream to generate spatial nulls in the direction of received clutter. The weighted data stream may be Doppler filtered, and used to form a clutter map. Target detections may be performed on the combined weighted data stream via a comparison to the clutter map.

In another embodiment of the present invention, a method for suppressing unwanted signals when detecting objects of interest in a detection system is provided. The method includes receiving data from at least two input data streams, with each input data stream representing a RADAR signal containing clutter. A background map is created by range, azimuth and Doppler bins containing residual clutter and locations/bins are selected for nulling. Adaptive nulling is performed independently on each selected Doppler bin to enable Doppler-specific spatial nulling at a range and azimuth location.

DETAILED DESCRIPTION

Figure 1:
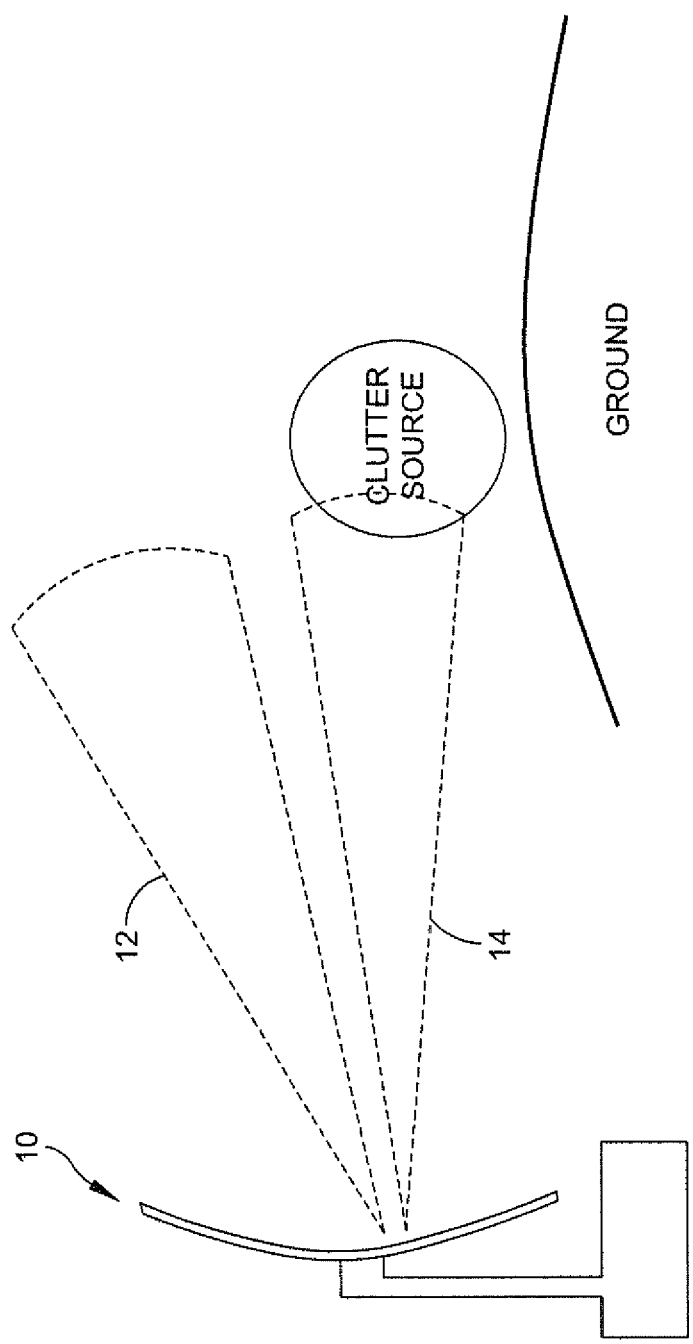
FIG. 1 is an illustration of a two beam parabolic reflector antenna useful for describing embodiments of the present invention.
Figure 2:
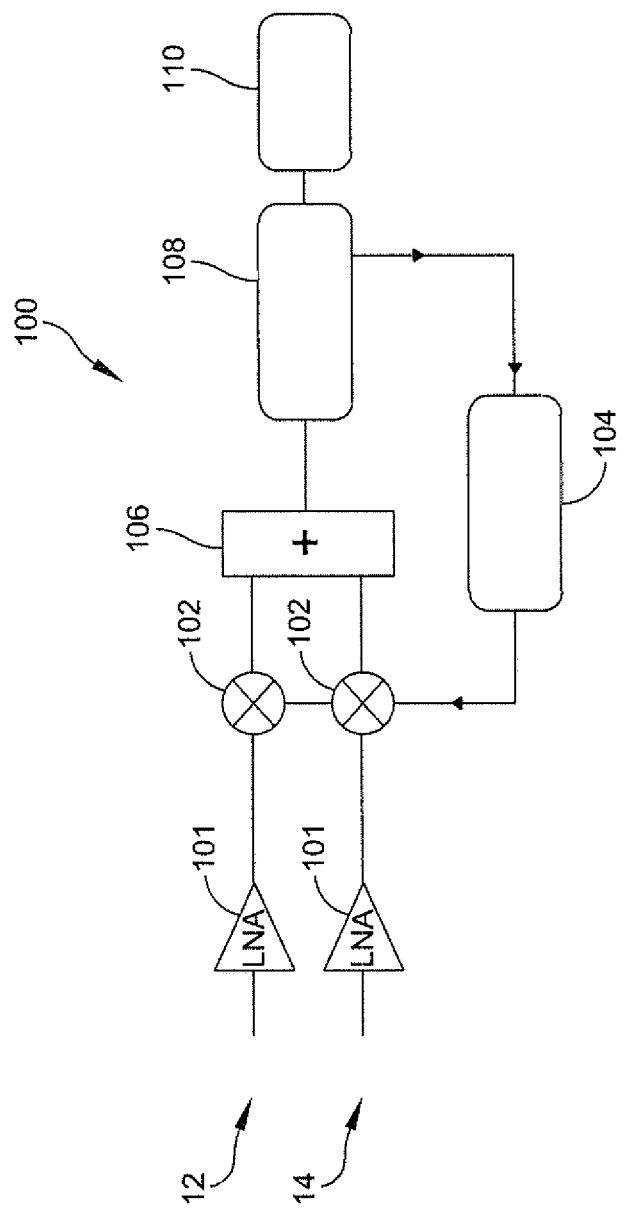
FIG. 2 is a simplified block diagram of a signal processing system for performing analog spatial nulling according to the prior art.

It is to be understood that the figures and descriptions of the present invention have been simplified to illustrate elements that are relevant for a clear understanding of the present invention, while eliminating, for purposes of clarity, many other elements found in typical remote sensing systems, including RADAR systems utilizing spatial and/or adaptive nulling techniques. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

According to embodiments of the present invention, digital spatial nulling techniques can be implemented to overcome the limitations of the above-described analog methods. For example, a set of complex digital weights may be generated in a computer processor by comparing the digitized returns of at least two antenna/receiver channels to form covariances which are the basis for the weights. These weights are then applied to at least one of the received signals, and used to reduce the power of the identified clutter and/or interference, while maintaining gain in the areas comprising desired signal return data.

Further embodiments of the present invention include systems and methods for suppressing unwanted signal interference and clutter using spatial nulling techniques for post Doppler-filtered data. An exemplary system may comprise, for example, an input means (e.g. receivers) for modulating return signals supplied by one or more antennas. The return signals may comprise desired target and/or background data, as well as unwanted clutter data. A processing system is provided for reducing or eliminating identified clutter by selectively weighting Doppler, range and azimuth data of at least one of the return signals, and generating a weighted detection signal representing a target and/or background as a function of range, azimuth angle and Doppler frequency.

The processing system used in any of the embodiments of the present invention may adaptively cancel or reduce clutter by weighting range/azimuth samples (range/azimuth bins) identified as comprising clutter, as well as individual Doppler bins for each range/azimuth bin. This may be achieved by, for example, selectively altering the amplitude and/or phase of at least one of the return signals. Embodiments of the present invention mitigate the reduction in coverage in high moving-Doppler clutter areas by minimizing null depth and/or width for individual Doppler bins comprising less clutter.

These spatial nulling techniques have the advantage over Doppler nulling approaches in that the higher altitude portions of a range bin are maintained. Spatial fluffing is also advantageous over Doppler nulling in that Doppler blinds are mitigated as the subsequent Doppler nulling can be reduced. This makes spatial nulling suitable for consideration in mitigating the interference from wind farms, for example. It is to be understood that spatial nulling reduces the amount of Doppler nulling needed as well as the amount of clutter map based CFAR. The result is a preservation of sensitivity throughout the coverage area except at the elevation angle, Doppler, azimuth and range of the clutter source.

Figure 3:
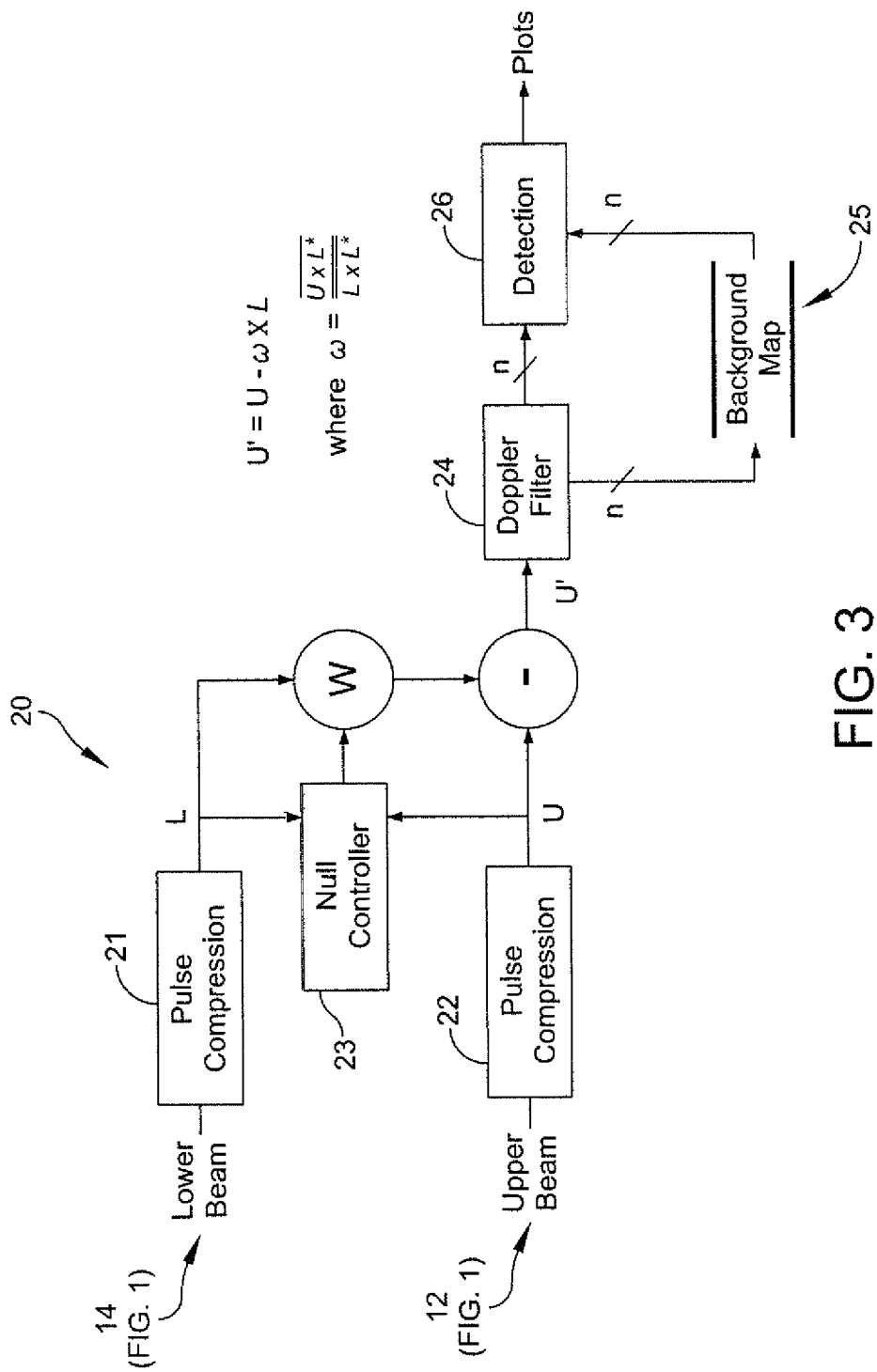
FIG. 3 is a simplified block diagram of a signal processing system for reducing clutter according to a first embodiment of the present invention.

With regard to the present invention, as shown in FIG. 3, a system 20 for performing spatial nulling prior to Doppler filtering is illustrated as implemented into a pulse-Doppler RADAR system. While not illustrated for the purposes of brevity, it should be understood that system 20 may also include one or more antennas, receivers and other components and related hardware associated with a RADAR system. For example, return signals from each pulse are subsequently captured and provided to at least one receiver or front-end module for signal modulation. This receiver may include, by way of example only, processing components, including one or more filters, a low-noise amplifier and a down converter, as will be understood by one of ordinary skill in the art. At least one A/D converter is provided for converting received analog return signals to digital form comprising I/Q components. In the case of a multi-channel system, such as the two-channel system shown in FIG. 3, one or more of these components may be provided for each channel.

Exemplary system 20 is responsive to input signals received from at least two beams (i.e. upper and lower beams 12,14 of antenna 10 of FIG. 1) detecting emissions from a common source (e.g. a target). For purposes of this description, it is assumed lower beam 14 is subject to increased clutter (e.g. ground clutter) compared to upper beam 12. System 20 may include, by way of non-limiting example, pulse compression modules 21,22 operative to receive post-N/D digitized in-phase and quadrature-phase (I/Q) signal data from lower beam 14 and upper beam 12, respectively. As will be understood by one of ordinary skill in the art, pulse compression techniques may be implemented to achieve high range resolution without the need for high-powered antennas. Pulse compression may be accomplished by various filtering and/or line delay arrangements. For example, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain. The output of pulse compression modules 21,22 comprises modulated upper and lower data streams U,L. As will be understood by one of ordinary skill in the art, further processing may be implemented to sample this data, thereby generating a predetermined number of range/azimuth bins.

System 20 further includes a null controller 23 operative to adaptively combine data streams U,L to reduce or eliminate portions of the signal comprising identified clutter. More specifically, null controller 23 is responsive to the outputs of pulse compression modules 21,22 and operative to generate a set of digital complex weights to be applied to the received data. Controller 23 may, for example, generate weights which adjust the gain for each range/azimuth bin comprising identified clutter or suspected targets, providing for both clutter correction (i.e. reduction) and/or signal enhancement. In the illustrated system, controller 23 is responsive to data stream L containing the stronger clutter signal (e.g. from high-level ground clutter) for reducing clutter in data stream U. Controller 23 may generate and apply a set of complex weights to data stream L such that identified clutter contained therein is equal in amplitude and inverse in phase to clutter in data stream U. Thus, combining L and U data streams may be used to reduce clutter in each range/azimuth bin of the resulting combined data stream.

Figure 4:
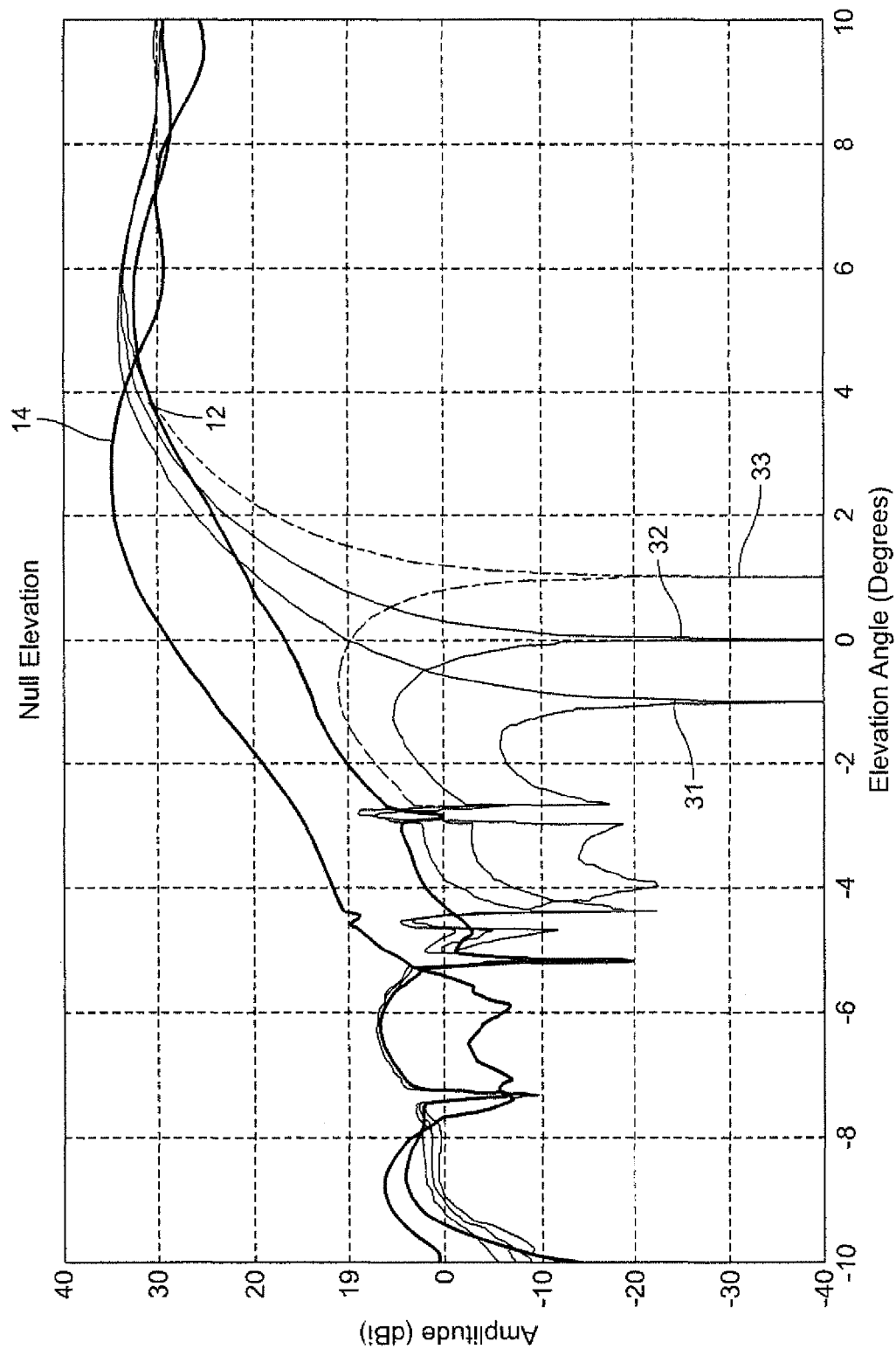
FIG. 4 is an illustration of the beam nulling associated with the upper beam as a function of elevation angle according to an embodiment of the present invention.

The results of spatial nulling processes according to embodiments of the present invention are shown in FIG. 4. Specifically, FIG. 4 illustrates upper beam 12 following nulling by lower beam 14 separately at clutter elevation angles −1.0 Deg, 0 Deg and +1.0 Deg with weights 31,32,33, respectively.

Figure 5:
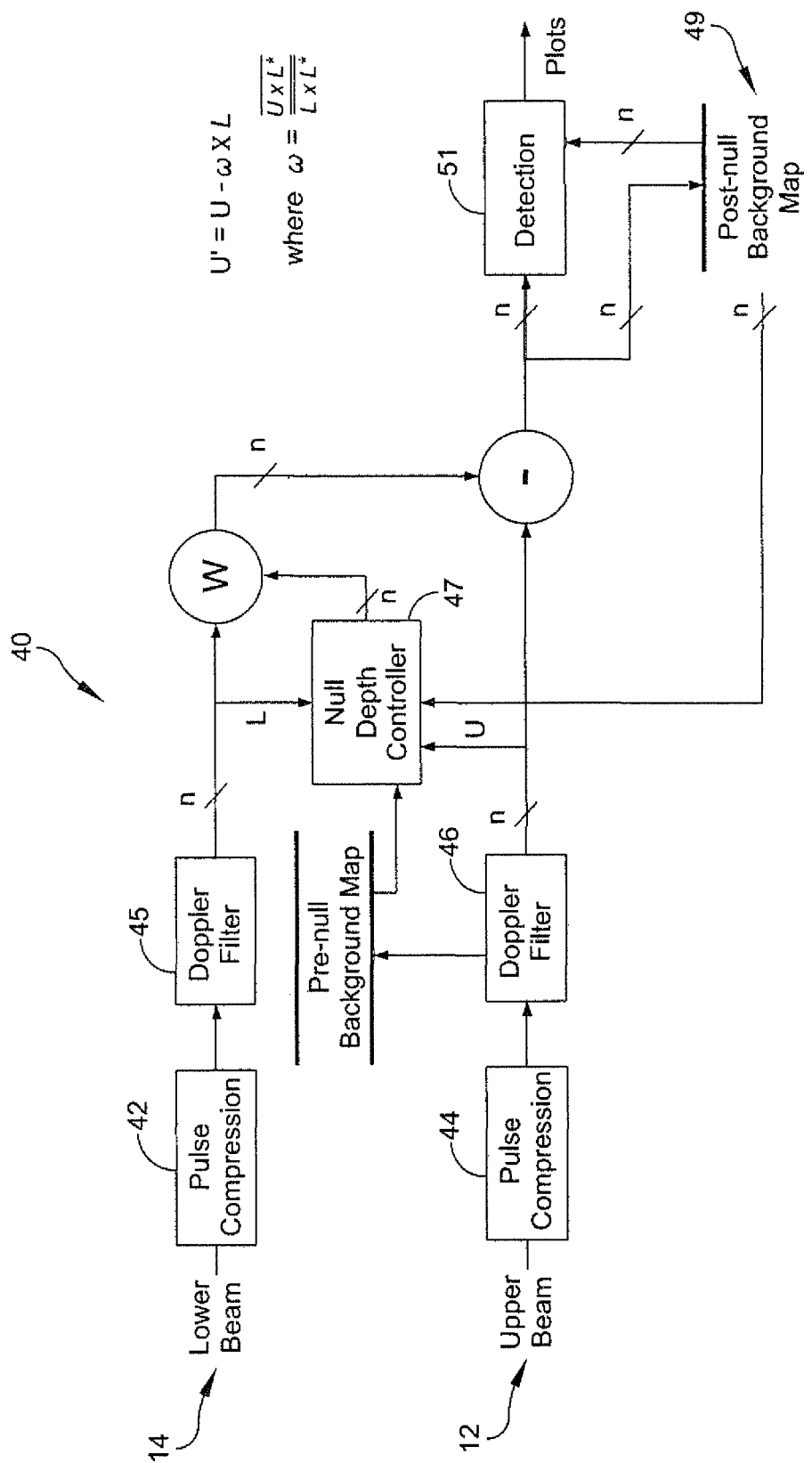
FIG. 5 is a simplified block diagram of a signal processing system for reducing clutter according to a second embodiment of the present invention.

Referring generally to FIG. 5, a Doppler-selective spatial nulling process according to a second embodiment of the present invention will be described in more detail. A signal processing system 40 may be responsive to at least two input signals comprising, for the purposes of this description, upper and lower beams 12,14, respectively, of antenna 10 of FIG. 1. As set froth above with respect to FIG. 3, system 40 may include pulse compression modules 42,44 operative to receive digital return signal data from upper and lower beams 12,14. The output of pulse compression modules 42,44 (data streams U,L) may be sampled and sorted into range bins. More specifically, Doppler filter banks 45,46 receive the time-domain complex data streams for conversion into the frequency domain to sort data into a plurality of Doppler bins for a given range (e.g. for each range bin) prior to the application of any spatial or adaptive nulling techniques.

A null-depth controller 47 is provided for combining data streams U,L. More specifically, null-depth controller 47 is operative to generate a set of complex weights to be applied to at least one of data streams U,L. Null-depth controller 47 may generate a digital complex weight for each Doppler bin within each range/azimuth bin of interest. In this way, wherein the prior art provides for clutter correction by adjusting gain as a function of azimuth, elevation and range, embodiments of the present invention may do so also as a function of Doppler-frequency.

In order to effectively reduce clutter in the received signal, null-depth controller 47 may identify locations of potential targets as well as locations of suspected clutter. Potential target identification may be achieved by, for example, comparing time-averaged return signals to the real-time upper and/or lower beam received signals, and performing a threshold comparison there between. In one embodiment, this process may include generating a pre-null background map 48 created using time-averaged range, azimuth and Doppler-frequency data from at least one of upper and lower beams 12,14. In one embodiment, map 48 may be generated from the beam known to comprise the least clutter. Similarly, clutter identification may be achieved via a comparison between background map 48 and the input signal determined to comprise heavier clutter levels. It should be understood that numerous alternate algorithms may be implemented for target and clutter identification. For example, clutter may be identified by comparisons to predetermined signatures indicative of clutter, received from an external source, such as an operator identifying clutter objects and/or may be based on analyzing the temporal presence of objects within the background. Null-depth controller 47 is responsive to pre-null background map 48 for controlling the selective-weighting of both range/azimuth bins, as well as individual Doppler bins. In this way, null depth will be set for each Doppler range-bin, rather than a single null depth for all Doppler bins of a given range.

In the illustrated embodiment, lower beam signal L is selectively weighted according to location and Doppler information of identified clutter. As will be understood, the weighting may also be adjusted to introduce gain on the portions of the signal comprising an estimated target. This weighted signal is added (or subtracted) to received upper beam signal, cancelling, or otherwise reducing identified clutter therein. For example, null-depth controller 47 may weight lower beam L such that the clutter contained therein is equal in amplitude and inverse in phase to the clutter in the at least one second beam.

Spatial nulling according to any of the embodiments of the present invention may be performed by combining (e.g. time averaging) the signals from respective upper and lower beam returns L,U to generate a set of complex weights ω, wherein:

$$\omega = \frac{\overline{U \times L^*}}{\overline{L \times L^*}}$$

with $\overline{U \times L^*}$ representing the average of the complex multiplication of upper beam return U and the complex conjugate of lower beam return L. An exemplary time averaging interval may selected which is sufficient to reduce the possibility of nulling desired targets moving in and out of the range, azimuth, Doppler bins.

In the illustrated arrangement of FIG. 5, the weights are selectively applied by null-depth controller 47 to data stream L, and subsequently subtracted from data stream U, to generate a weighted data stream U', wherein:

$$U' = U - \omega \times L$$

Target detection is achieved according to any number of processes. For example, a time-averaged version of weighted return signal U' may be generated and compared against the real-time weighted signal U' for target detection. In one embodiment, a running average of weighted return signal U' may be used to generate a post-null background map 49 comprising adjusted range, azimuth and Doppler-frequency data. A threshold comparison may be made between this map 49 and the real-time weighted return signal U' for target detection via a detector 51. In the event that strong clutter exists in a given map location, the null controller operates to place a stronger null at that location. Alternatively, if there is relatively weak clutter in a given map location, then the null is less deep. This optimizes the impact on the gain pattern, by limiting pattern nulling where there is relatively weaker clutter.

Figure 6:
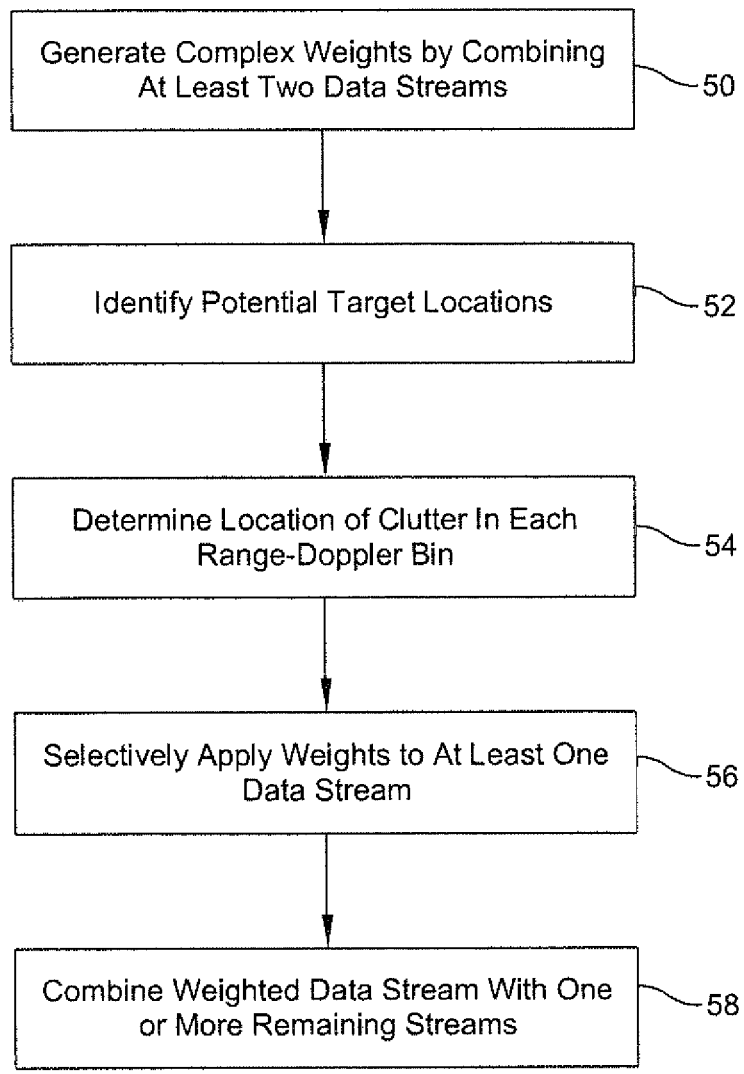
FIG. 6 is a process-flow diagram illustrating aspects of a null-depth controller according to an embodiment of the present invention.

Referring generally to FIG. 6, an exemplary process-flow diagram describing the operation of a null-depth controller according to embodiments of the present invention is shown and described herein. By way of non-limiting example, in step 50, the null-depth controller generates a set of complex weights. This may be accomplished by, for example, combining or time averaging at least two received data streams (e.g. upper and lower streams U,L). In step 52, the controller identifies potential targets via a comparison between the real-time received data streams and a time-averaged background map. The location of clutter in each range-Doppler bin is determined in step 54 by, for example, comparing the time-average background map to a received data stream known to comprise clutter. Referring generally to step 56, the controller selectively applies the generated weights to identified areas of clutter (or target locations) to one of the at least two data streams. Finally, in step 58, the controller may combine the weighted data stream with the one or more remaining data streams. It should be understood that null-depth controllers according to embodiments of the present invention may be implemented in hardware, or software, such as that used in conjunction with a FPGA as will be understood by one of ordinary skill in the art.

Figure 7:
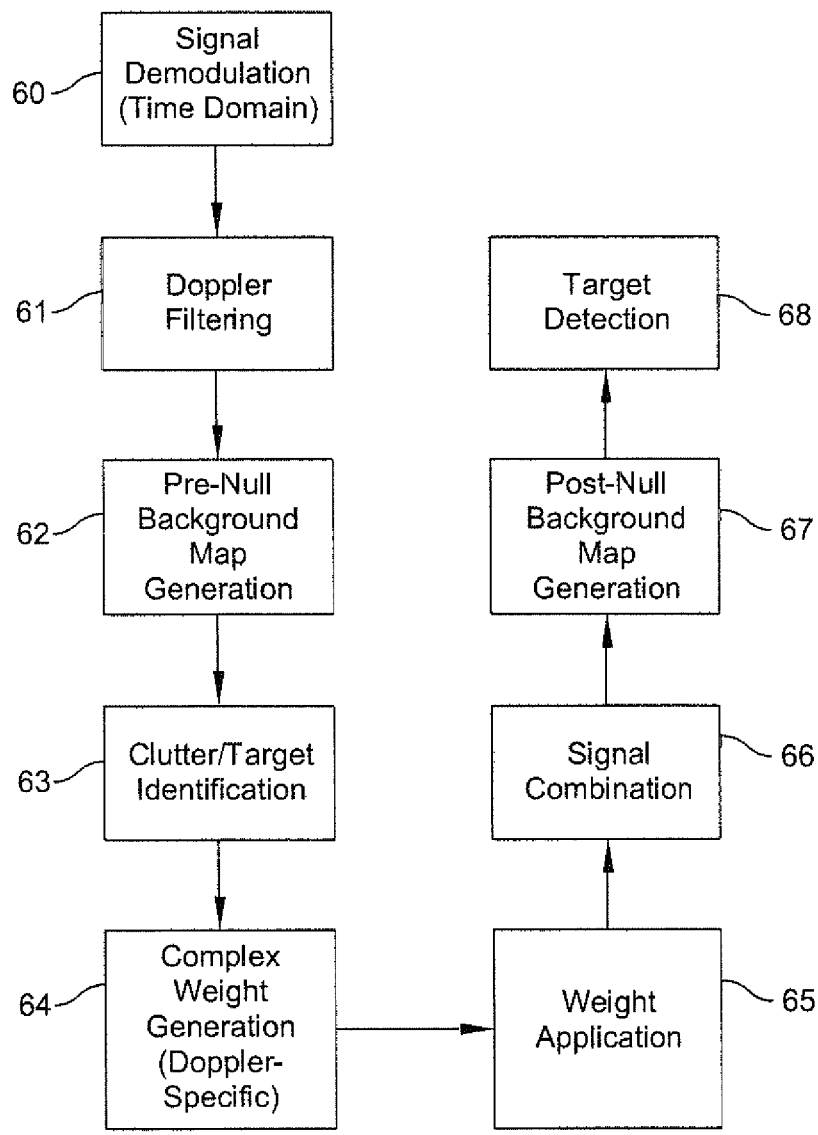
FIG. 7 is a process-flow diagram illustrating a clutter reduction method according to an embodiment of the present invention.

FIG. 7 is a process-flow diagram illustrating a signal processing method according to an embodiment of the present invention. In step 60, at least two received return signals are demodulated and range-specific data is extracted (e.g. data is sorted into range bins). In step 61, the data is subjected to a Doppler-filtering processes, wherein frequency data is extracted from the signal generating a plurality of Doppler bins for each range bin. In step 62, a first background map Is generated using averaged un-weighted azimuth, range and Doppler data extracted from at least one of the at least two return signals. In step 63, clutter is identified by, for example, comparing the generated background map to one of the received return signals. In step 64, a set of complex weights is generated for each range-Doppler bin by, for example, time averaging and combining the at least two received return signals. In step 65, these complex weights are selectively applied to at least one of the received return signals (or selected portions thereof) identified as comprising clutter. More specifically, individual weights are applied to each Doppler bin identified as comprising clutter exceeding a predetermined threshold. In step 66, this weighted signal is combined with the remaining un-weighted return signal to reduce or cancel clutter therein. In step 67, a post-null background map may be created by time-averaging the weighted return signal. In step 68, detections may be performed via a comparison between the real-time weighted return signal and the post-null background map.

It should be understood that systems and methods of the present invention may be used to reduce or cancel unwanted signals in remote sensing systems of a variety of types, including SONAR, RADAR, navigation and guidance systems.

The embodiments are provided by way of example only, and other embodiments for implementing the methods described herein may be contemplated by one of skill in the pertinent art without departing from the intended scope of this disclosure. For example, systems, including the null controllers described herein, may include memory containing data, which may include instructions, the instructions when executed by a processor or multiple processors, cause the steps of a method for performing the signal processing and weight creation set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for suppressing clutter when detecting objects of interest in a detection system comprising an antenna system and at least an two receive beams, comprising:
  receiving complex I/Q data from each of said at least two receive beams representing a signal containing clutter;
  Doppler filtering the data to generate data streams for each of the beams comprising Doppler bins representative of range values according to Doppler frequency;
  combining the at least two data streams to generate complex weights for each Doppler bin;
  applying the generated complex weights to at least one of the at least two data streams for generating a weighted data stream for spatial nulling in the direction of received clutter;
  combining the at least one weighted data stream with at least one remaining data streams to generate spatial nulls in the direction of received clutter;
  forming a post-null clutter map; and performing target detection on the combined weighted data stream using the post-null clutter map.

2. The method of claim 1, wherein the step of combining at least two data streams to generate complex weights for each Doppler bin further comprises using a background clutter map to generate the complex weights.

3. The method of claim 1, wherein the step of combining the at least two data streams to generate complex weights for each Doppler bin further comprises time averaging a first (U) and a second (L) data stream to generate a set of complex weights ω, wherein:

$$\omega = \frac{\overline{U \times L^*}}{L \times L^*},$$

wherein L* is the complex conjugate of the second data stream L.

4. The method of claim 1, wherein the post-null clutter map comprises weighted range, azimuth and Doppler-frequency data.

5. A system for suppressing clutter when detecting objects of interest, comprising:
   an antenna array configured to receive radar signals containing clutter;
   a digital receiver adapted to convert the radar signals received by the radar subarrays to complex I/Q samples associated with at least an upper receive beam and a lower receive beam, the I/Q samples containing said clutter;
   a Doppler filter for Doppler filtering the pulse compressed data to generate upper and lower data streams for said upper and lower beams, respectively, comprising Doppler bins representative of range values according to Doppler frequency;
   a combiner for selectively combining the upper and lower data streams using a background clutter map to generate complex weights for each Doppler bin;
   means for applying the generated complex weights to one of the upper and lower data streams for generating a weighted data stream for spatial nulling in the direction of received clutter;
   an adder for combining the weighted data stream with the other data stream to generate spatial nulls in the direction of received clutter;
   a memory for storing data representative of the spatial nulls in a post null clutter map; and
   a detector performing target detection on the combined weighted data stream using the post null clutter map.

6. The system of claim 5, wherein the combiner for selectively combining the upper and lower data streams using a background clutter map to generate complex weights for each Doppler receives input data from the post-null clutter map to generate said complex weights.

7. The system of claim 6, wherein the combiner for selectively combining the upper and lower data streams using a background clutter map to generate complex weights for each Doppler bin further comprises an averager for time averaging the upper (U) and lower (L) beam data streams to generate a set of complex weights ω, wherein:

$$\omega = \frac{\overline{U \times L^*}}{L \times L^*},$$

wherein L* is the complex conjugate of the lower beam data stream L.

8. A method for suppressing clutter when detecting objects of interest in a detection system comprising an antenna system and at least an upper and lower receive beam, comprising:
   receiving digitized complex I/Q data streams from each of the upper and lower receive beams representing a radar signal containing clutter;
   combining the upper and lower data streams to generate a set of complex weights;
   applying the complex weights to one of the upper and lower data streams for generating a weighted data stream for spatial nulling in the direction of received clutter;
   combining the weighted data stream with the other data stream to form a combined, weighted data stream to generate spatial nulls in the direction of received clutter;
   Doppler filtering the combined weighted data stream;
   forming a clutter map from the outputs of the Doppler filter; and
   performing target detection on the combined weighted data stream using the clutter map.

9. The method of claim 8, wherein the step of combining the at least two data streams to generate complex weights further comprises time averaging a first (U) and a second (L) data stream to generate a set of complex weights ω, wherein:

$$\omega = \frac{\overline{U \times L^*}}{L \times L^*},$$

wherein L* is the complex conjugate of the second data stream L.

* * * * *